United States Patent Office 2,994,586
Patented Aug. 1, 1961

2,994,586
PURIFICATION OF DIBORANE
George F. Huff, Pittsburgh, Pa., assignor to Callery Chemical Company, Pittsburgh, Pa., a corporation of Pennsylvania
No Drawing. Filed Nov. 6, 1953, Ser. No. 390,719
5 Claims. (Cl. 23—204)

Diborane ($B_2H_6$), which is useful for such purposes as a high energy fuel and as an intermediate in the preparation of a wide variety of other boron compounds, may be made by various methods. One involves passing a mixture of hydrogen ($H_2$) and a boron halide ($BX_3$), such as boron trichloride ($BCl_3$) or boron tribromide ($BBr_3$) through an electrical discharge. Diborane prepared by such a process is always contaminated with hydrogen halide. Other procedures for its preparation involve the treatment of a hydride, such as lithium hydride (LiH), lithium aluminum hydride ($LiAlH_4$), or an alkali metal borohydride, e.g., sodium borohydride ($NaBH_4$) with a boron halide, usually $BF_3$. These procedures likewise result in diborane containing acid contaminant such as hydrogen chloride (HCl) or a boron halide.

The removal of such acid contaminants from diborane is exceeding difficult by standard procedures. For instance, both hydrogen chloride and, for example, boron trifluoride form azeotropic mixtures with diborane so that separation of the two compounds can not be effected by low temperature distillation. Likewise, those acid materials have vapor pressures nearly equal to that of diborane so that removal of the acid from diborane by fractional condensation is not possible. Moreover, the molecular weight of hydrogen chloride is so close to that of diborane that such separatory methods as thermal diffusion or barrier diffusion would be extremely difficult and expensive for the removal of HCl from diborane.

It has been proposed (75 JACS 191) to separate hydrogen halides from diborane by adding pyridine ($C_5H_5N$) to the mixture with formation of $C_5H_5N:BH_3$ which then reacts with the hydrogen halide to form $C_5H_5N:BX_3$ and hydrogen. In addition to being unwieldy for practice on a commercial scale, this procedure is objectionable in that it involves the loss of at least 1 mol of diborane for each 6 mols of hydrogen halide, such as HCl.

It is among the objects of this invention to separate diborane from an acid impurity that is simple, easily and inexpensively practiced using standard apparatus and readily available reagents, effectively removes the acid impurity, and in certain embodiments actually increases the yield of diborane.

Other objects will appear from the following specification.

I have discovered, and it is upon this that the invention is largely predicated, that acid contaminant, for instance boron halide and hydrogen halide, of diborane can be removed readily by contacting the mixture of diborane and acid with a hydride in an inert liquid whereby the hydride reacts with the acidic constituent to form a metallic salt, and also in certain instances hydrogen or diborane.

The dialkyl ethers of poly 1,2 ethane diols:

$$R(OCH_2CH_2)_nOR$$

where R is an alkyl radical and $n$ is 2 or a greater whole number serve admirably as inert liquids for the practice of this invention. Examples of such ethers are the dimethyl ethers of diethylene glycol, of triethylene glycol and of tetraethylene glycol. Similarly, the diethyl and other lower dialkyl ethers of polyethylene glycol may be used.

As an example of the practice of the invention, diborane contaminated with hydrogen halide is passed through a scrubbing tower containing a solution of sodium borohydride in a polyethylene glycol ether. If the acid is hydrogen chloride it will be removed according to the following reaction:

$$NaBH_4 + HCl \rightarrow \tfrac{1}{2}B_2H_6 + H_2 + NaCl$$

Thus in this case the impurity in the diborane is changed from HCl to hydrogen, with the gaseous mixture of $B_2H_6$ and $H_2$ leaving the scrubbing tower in which the solid sodium chloride remains.

In some applications in which diborane is used, further purification will be unnecessary since the hydrogen will be harmless. However, if pure diborane is desired, the hydrogen can be easily removed by fractional condensation, by selective adsorption, or by diffusion which is rendered more feasible than in the case of HCl by the large difference in the molecular weights of hydrogen and diborane.

The method of this invention is especially advantageous where the contaminant is a boron halide. In this case the boron halide is removed in the scrubbing tower in accordance with the following reactions:

$$3NaBH_4 + 4BF_3 \rightarrow 2B_2H_6 + 3NaBF_4$$
$$3NaBH_4 + BCl_3 \rightarrow 2B_2H_6 + 3NaCl$$

In these instances, as will be observed, the boron halide is converted to a sodium salt which is left behind as the purified diborane leaves the scrubbing tower but there is the special advantage that the boron halide can be completely removed with the formation of no other gaseous material than pure diborane with an actual increase in its amount of 1 mol for every 2 mols of boron halide present in the original mixture.

Liquids other than the polyethylene glycol ethers that are inert to diborane may, of course, be used. Amines are not suited to the purposes of the invention, however, because they react with diborane. Although it is preferred to use an inert liquid that is a solvent for the hydride, there may be used a suspension of the hydride in the inert liquid with which the contaminated diborane is contacted. Similarly, although the invention has been described in detail with reference to sodium borohydride as the acid removing reagent, other hydrides are equally operative, examples being potassium borohydride ($KBH_4$), the alkali metal hydrides, magnesium borohydride $[Mg(BH_4)_2]$, lithium aluminum hydride ($LiAlH_4$) and the like.

The method is not dependent upon any specific pressure and temperature conditions. The acid removing reaction occurs with satisfactory rapidity and completion, however, at normal room temperature and atmospheric pressure.

According to the provisions of the patent statutes, I have explained the principle and mode of practicing my invention and have described what I now consider to represent its best embodiment. However, I desire to have it understood that, within the scope of the appended claims, the invention may be practiced otherwise than as specifically described.

I claim:
1. That method of separating diborane from a mixture with a volatile acid impurity comprising contacting said mixture with a metallic hydride in a lower alkyl ether of a polyalkyl glycol of the formula $R(OCH_2CH_2)_nOR$ where R is a lower alkyl radical and $n$ is a whole number from 2 through 4, inclusive and thereby converting said acid impurity to a non-volatile inorganic salt, and recovering the acid-free diborane.
2. A method according to claim 1, said glycol being a polyethylene glycol.

3. That method of separating diborane from a mixture with a volatile acid impurity comprising contacting said mixture with a solution of a metallic borohydride in a lower alkyl ether of a polyalkyl glycol of the formula $R(OCH_2CH_2)_nOR$ where R is a lower alkyl radical and n is a whole number from 2 through 4, inclusive and thereby converting said acid impurity to an inorganic salt, and recovering the acid-free diborane.

4. A method according to claim 3, said glycol being a polyethylene glycol.

5. A method according to claim 4, said borohydride being $NaBH_4$.

References Cited in the file of this patent

UNITED STATES PATENTS

| | | |
|---|---|---|
| 2,550,985 | Finholt | May 1, 1951 |
| 2,553,198 | Lesesne | May 15, 1951 |
| 2,555,512 | Schlesinger et al. | June 5, 1951 |